United States Patent [19]

Helling et al.

[11] Patent Number: 4,530,257
[45] Date of Patent: Jul. 23, 1985

[54] FRICTIONAL RING GEAR

[76] Inventors: Jurgen Helling, Botzelaer 26A, B-4680 Gemmenich, Belgium; Ulrich Rohs, Roonstr. 11, D-5160 Duren, Fed. Rep. of Germany

[21] Appl. No.: 502,453

[22] Filed: Jun. 9, 1983

[30] Foreign Application Priority Data

Jun. 15, 1982 [DE] Fed. Rep. of Germany ....... 3222481

[51] Int. Cl.³ .................. F16H 15/50; F16H 15/08
[52] U.S. Cl. ........................................ 74/796; 74/200
[58] Field of Search ............... 74/196, 194, 200, 201, 74/796; 474/8

[56] References Cited

U.S. PATENT DOCUMENTS

| 1,478,075 | 12/1923 | Webster | 74/201 |
| 2,555,079 | 5/1951 | Giorgi | 74/201 |
| 3,240,078 | 3/1966 | Newell | 74/200 |
| 3,387,507 | 6/1968 | de Coye de Castelet | 74/796 |
| 4,424,726 | 1/1984 | Galbraith | 74/796 |

FOREIGN PATENT DOCUMENTS

| 1067723 | 12/1979 | Canada | 74/796 |
| 1625107 | 7/1970 | Fed. Rep. of Germany . | |
| 321661 | 11/1932 | France | 74/796 |

Primary Examiner—George H. Krizmanich
Assistant Examiner—Dirk Wright
Attorney, Agent, or Firm—Collard, Roe & Calgano

[57] ABSTRACT

A friction ring gear consisting of at least three driving disks which include axially movable conical disks disposed on a segment of a circle. The driving disks drive a friction ring which engages their wedge-shaped guide surfaces. There is provided a support disk on a floating axle consisting of two axially movable disk halves disposed centrally with respect to the friction ring and surrounded by the driving disks. The support disk engages all wedge-shaped guide surfaces of all driving disks, and if need be is provided with a changeable convex peripheral rim.

6 Claims, 4 Drawing Figures

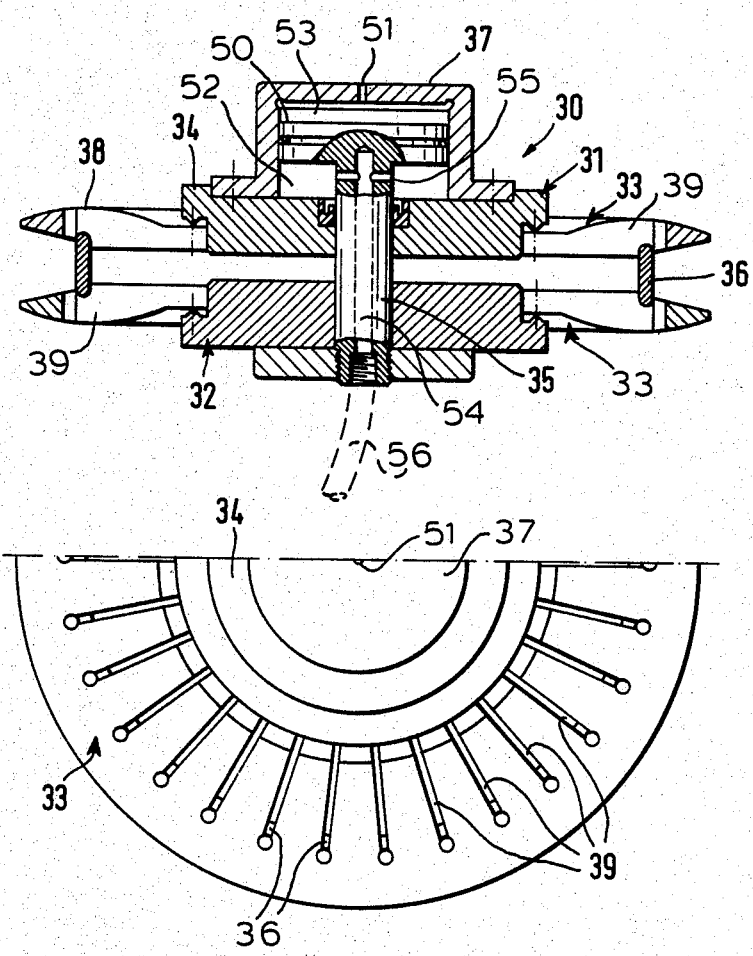

FRICTIONAL RING GEAR

The present invention relates to a friction ring gear for the stepless transmission of a rate of revolutions. Such a friction ring gear consists of at least three driving disks arranged on a segment of a circle, a support disk arranged therebetween and a friction ring connecting all driving disks. Each driving disk consists of a pair of oppositely disposed conical disk halves, forming a wedge-shaped guide surface therebetween, movable axially against a spring force while a cylinder actuated by a pressure medium controls the axial movement of the conical disk halves. The friction ring is guided along the wedge-shaped guide surfaces of the driving disks.

Gears for stepless change of a rate of rotation of this type are well known, for example see DE-PS No. 537657.

In this known arrangement, both the driving disks as well as the support disks are supported on immovable axle shafts in the gear housing. The driving disks, rotating in the same direction, are supported on the support disk which effectively results in a single axle. So as to avoid any losses due to slip because of the high peripheral velocity of the driving disks, the driving disks carry a rolling rim supported on respective spheres, which rolls off on the support disk. Since the driving disks of the driving side revolve at a different rate of revolutions, and therefore at a different peripheral velocity than the driving disks of the take-off side, considerable slip losses arise on the support disk in spite of the roller rim on the driving disks. Furthermore the roller rims are expensive, complicated, and prone to disturbances.

It is a primary object of the present invention to provide a friction ring gear which operates substantially without any slip losses and which can be manufactured inexpensively. The basis of the invention is to provide a support disk that does not engage the periphery of the driving disks but rather engages their wedge-shaped guides. As the wedge-shaped guides of the driving disks change as a result of the axial displacement of the disk halves, a corresponding change in the support disk is required.

The invention, therefore, consists in the support disk having axially movable disk halves, such that the width of the support disk corresponds to the available inner diameter at the engagement locations of the driving disks. In this manner reliable frictional contact and good support results, which in turn ensures a reliable force transmission to the friction ring.

The invention will be described and understood more readily when considered together with the following drawings, in which:

FIG. 3 is a cross-sectional view of the supporting disk of the frictional ring gear of FIG. 2; and FIG. 4 is a partial plan view of the supporting disk according to FIG. 3.

Figure 1:
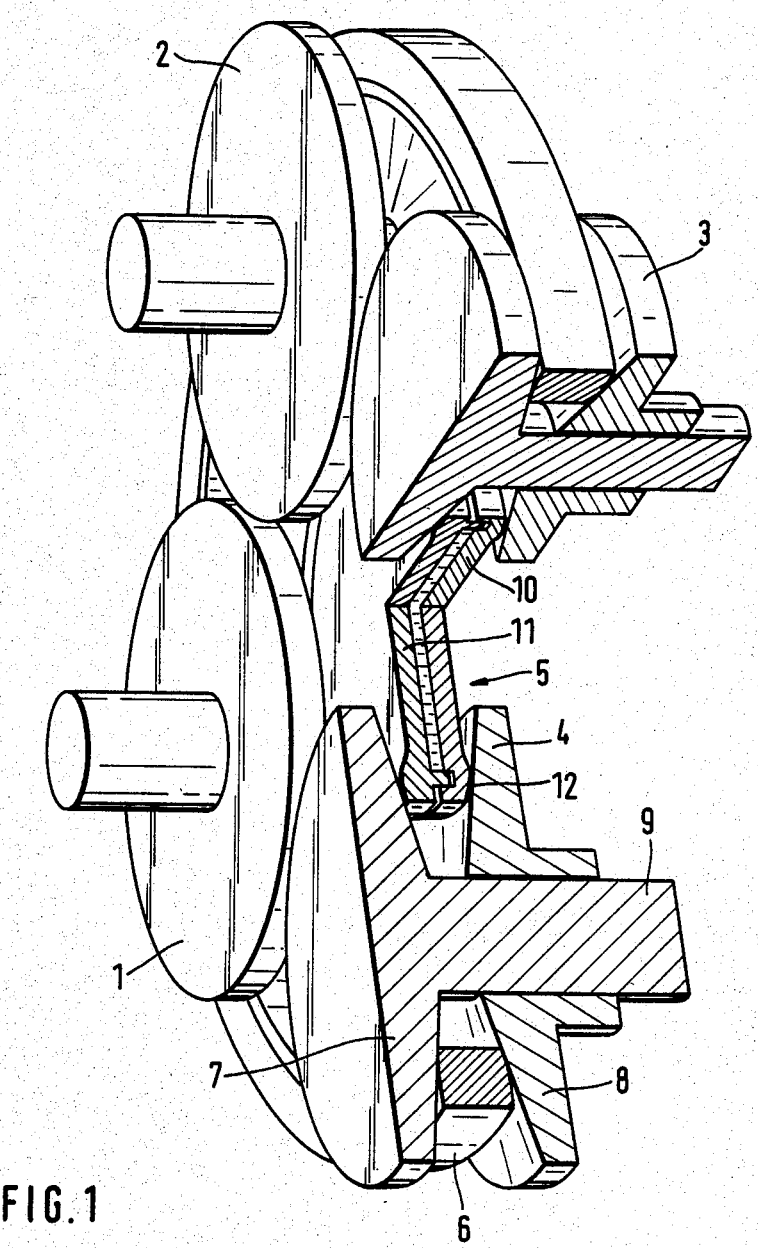
FIG. 1 is a schematic perspective view of the frictional ring gear according to the present invention.

FIG. 1 schematically shows a friction ring gear for stepless adjustment of the rate of revolutions consisting of two driving disks 1 and 2, two take-off driving disks 3 and 4, an abutment or supporting disk 5, and a friction ring 6. Friction ring 6 is constructed in one piece of a rigid material such as metal.

Each driving disk 1 through 4 consists of two conically shaped and axially displaceable disk halves 7 and 8 which, as shown in FIG. 1, are so formed that one disk half 7 is rigidly connected with an associated drive or a take-off shaft, designated 9, and the other disk half 8 is axially displaceable on the drive or take-off shaft. Axial displacement is accomplished by means of a cylinder (not shown) actuated by a pressure medium and acting on the disk half 8, as well as by additional tension or compression springs which ensure that in the event the cylinder actuated by the pressure medium is non-operative, a suitable standby transmission adjustment is available.

Both a friction ring 6 surrounding the driving disks 1 to 4 (in lieu of a wedge belt or the like) as well as a freely movable (supported on a floating axle shaft) support disk 5 surrounded by the driving disks 1 to 4 engage the wedge-shaped recesses or guides of the driving disks. The support disk 5 consists of two disk halves 10 and 11 which are axially movable against one another under the influence of a pressure medium, and whose rim is shaped as a wedge-shaped profile 12.

Support disk 5 always engages those locations of the wedge-shaped guides of driving disks 1 to 4, which momentarily have the same inner axial width, and thus also the same peripheral velocity, so that engagement is accomplished substantially without any slip. The position of the axle of the support disk is adjusted in a self-actuating or floating manner according to the transmission ratio selected and implemented by the driving disks 1 through 4. (It is assumed that driving disks 1 and 2 and take off disks 3 and 4 are always moved synchronously in an axial direction, and that each pair rotates at the same rate of revolutions per minute.) According to the different axial adjustment of the driving disks and hence of the transmission ratio, the spatial position of friction ring 6 changes, but always remains co-axial with respect to support disk 5 because of the floating axle of the support disk.

Figure 2:
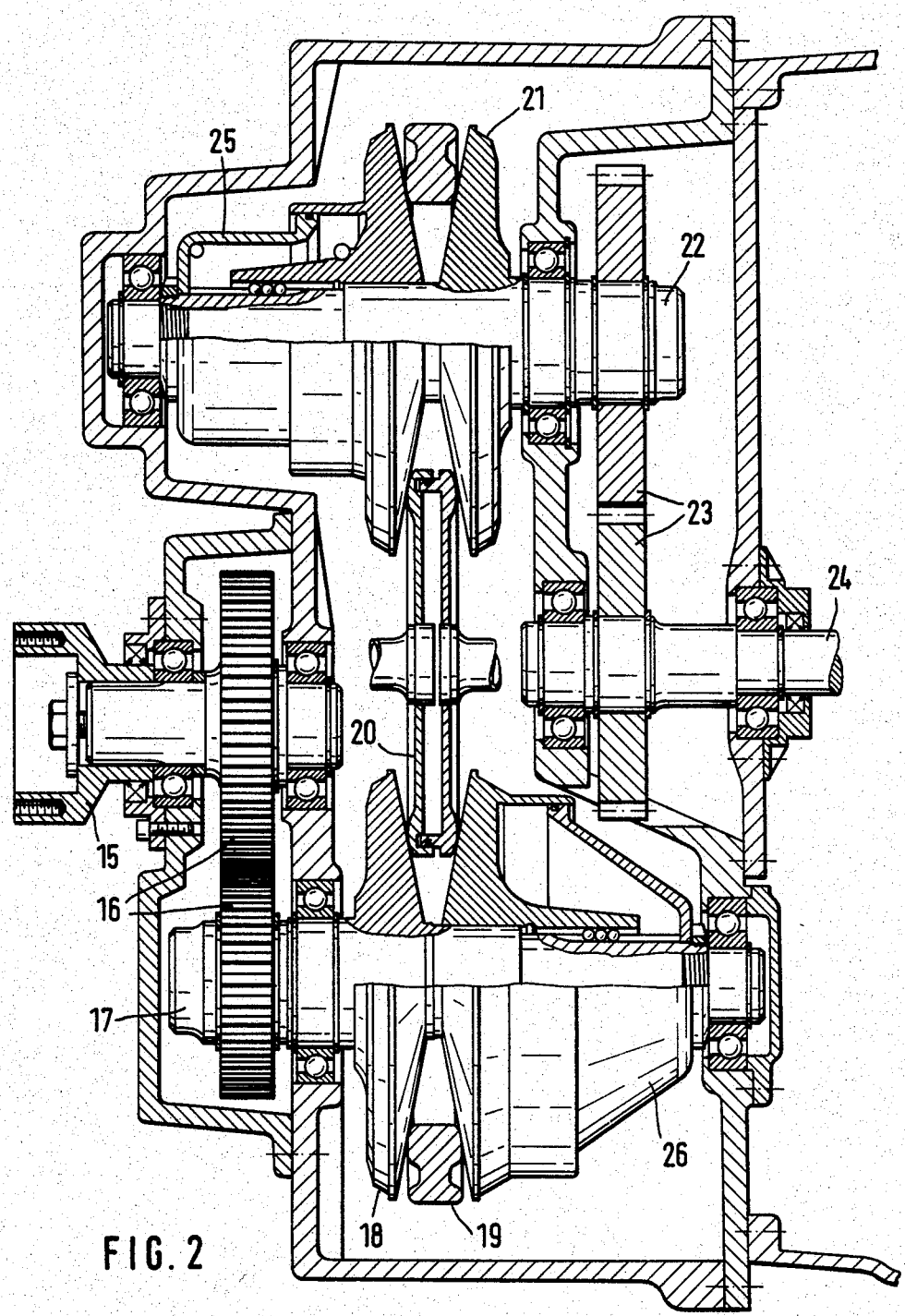
FIG. 2 is a cross-sectional view of a frictional ring gear according to the present invention.

In FIG. 2 an embodiment of the gear of the aforedescribed type is shown in cross-section. Here the driving force is transmitted from a drive shaft 15 through spur gears 16 to a drive shaft 17 of a driving disk 18. Driving disk 18 is connected through a friction ring 19 and through a support disk 20 to take-off disk 21. Take-off shaft 22 of take-off disk 21 is connected through a spur gear drive 23 with a take-off shaft 24. Driving disks 18 and 21 are provided on one side each with a cylinder, designated 26 and 25 respectively, actuatable by a pressure medium. The respective axial spacing between the driving disk halves, which are formed from conical disks, and consequently the transmission ratio are controlled by cylinders 25 and 26. Support disk 20 is also connected with a conduit (not shown) for a pressure medium, so as to achieve tailoring of the axial distance of its half-portions to the changing axial distance of the half-portions of the driving disks. Obviously, as friction ring 19 is of one-piece rigid construction and therefore its circumference cannot change, as the axial spacing between the driving disk halves of driving disk 18 is increased, a corresponding decrease in this axial spacing is required by take-off disk 21 and vice versa.

If only the axial distance of the disk half-portions 10 and 11 of support disk 5 is changed, there then results a small slippage between the engagement surfaces because of the geometrical conditions prevailing thereat. It is, therefore, advantageous, if concurrently with the change of the axial spacing of the support disk a change of the engagement profile of the support disk is made in such a manner that a point-to-point contact results, so that no slippage occurs. This is accomplished by a simultaneous, if small, change in the effective radius of the support disk.

In order to permit this there is provided the support disk, 30 illustrated in FIGS. 3 and 4, consisting of disk halves 31 and 32. Each disk half consists in turn of a spring-elastic disk ring 33 and a central hub 34 which presses from the exterior against the inner ring of disk ring 33. The hubs 34 of both disk halves 31 and 32 are connected by an axle bolt 35. Bolt 35 also limits the maximum axial spacing between disk halves 31 and 32. Furthermore, there is disposed between disk rings 33 of both disk halves a support ring 36, whose diameter is less than the outer diameter of disk rings 33, but greater than that of hubs 34, or of the inner diameter of disk rings 33.

The axial movement of support disk 30 is accomplished by means of pressure box 37 which includes a piston 50 to which axle bolt 35 is attached as a piston bar and which defines inner and outer pressure chambers 52 and 53 within pressure box 37. Axle bolt 35 is provided with an axial bore 54 which is closed at piston 50 and which opens into pressure chamber 52 by means of passages 55. A pressure medium conduit, designated 56 and shown in phantom, is provided to deliver a pressure medium through bore 54 of axle bolt 35 to chamber 52. Pressure box 37 further includes an opening or passageway 51 which connects pressure chamber 53 to atmosphere in order to keep chamber 53 free of pressure or vacuum.

In operation, when it is desired to move disk halves 31 and 32 toward each other, a pressure medium is introduced to bore 54 of axle bolt 35 via pressure medium conduit 56. The pressure medium enters into pressure chamber 52 thereby exerting pressure against piston 50 whereby disk half 31 is moved downwardly in FIG. 3 along axle bolt 35 which, in cooperation with back plate 59, compresses hubs 34 and hence disk halves 31 and 32. When this occurs, the peripheral edges of disk halves 31 and 32 move axially away from each other, as explained below, such that the frictional surfaces of disk 30 which engage the surrounding disks of the gear are always in contact therewith. When it is desired to move disk halves 31 and 32 away from each other in order to reduce the peripheral width of disk 30, pressure medium is released from chamber 52 relieving the compressive pressure on disk halves 31 and 32 thus allowing them to move apart axially with respect to each other.

As shown in FIG. 3, each disk ring 33 has a convex profile 38 in cross-section on its peripheral edge or rim. When a pressure force is transmitted from pressure box 37 to the disk halves 31 and 32 so that their axial distance along axle bolt 35 is reduced, then, according to the law of levers, the outer rims of disk rings 33 will move outwardly beyond supporting ring 36. This results in a displacement of the convex profile 38 with respect to the center plane. In order to increase elasticity of disk rings 33, they are provided with radial slits 39, as clearly seen in FIG. 4.

If the convex profile 38 is so chosen that it corresponds exactly to the geometric ratios of the wedge guides of driving disks 1 to 4 at the different axial spacings of the disk halves of the driving disks, then a slip-free force transmission on the support disk can be obtained.

What is claimed is:

1. A friction ring gear for stepless transmission of a rate of revolutions comprising:
(a) at least three driving disks supported on a segment of a circle, said driving disks each including a pair of opposing disk halves axially movable against a spring force and further including a cylinder actuable by a pressure medium controlling the axial movement of the disk halves, said disk halves of each driving disk forming a wedge-shape therebetween;
(b) a one-piece friction ring formed of a rigid material connecting all driving disks and guided in their wedge-shaped recesses; and
(c) a support disk on a floating axle comprising a pair of axially displaceable disk halves each of which includes a spring elastic disk ring, a support ring disposed between said disk rings having a diameter less than the outer diameter of the disk rings and greater than the inner diameter of the disk rings, a central hub engaging each disk ring from the exterior thereof, and actuating means for moving said hubs axially with respect to each other so as to axially displace said disk halves.

2. The friction ring gear as defined in claim 1, wherein the peripheral rim of said disk rings are provided with a convex profile.

3. The friction ring gear as defined in claim 1, wherein the actuating means for moving the hubs of said support disk includes a mechanism actuated by a pressure medium.

4. The friction ring gear as defined in claim 3, wherein the support disk is connected with a conduit for a pressure medium.

5. The friction ring gear as defined in claim 1, wherein said one-piece friction ring is formed of a metallic material.

6. The friction ring gear as defined in claim 3, wherein the actuating mechanism actuated by a pressure medium includes a piston and cylinder arrangement movable with respect to each other by said pressure medium.

* * * * *